Figure 1:
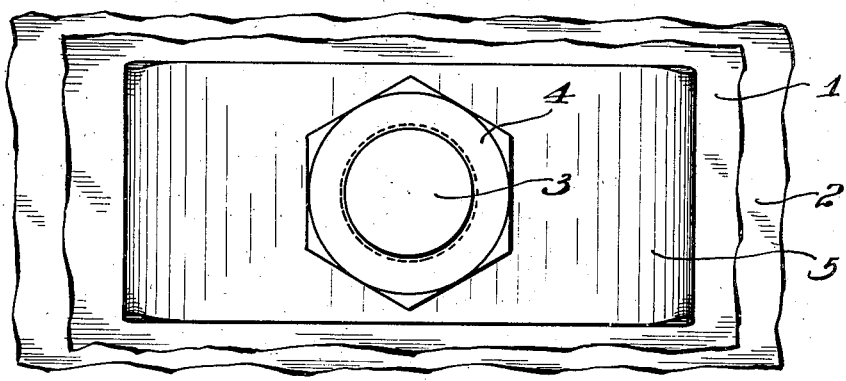

July 1, 1941.    R. J. McCOMB    2,247,959

SPRING WASHER

Filed Nov. 25, 1938

WITNESSES
A B Wallace
E. O. Johns

INVENTOR.
Richard J. McComb
BY Brown, Critchlow & Flick
his ATTORNEYS.

Patented July 1, 1941

2,247,959

UNITED STATES PATENT OFFICE 2,247,959

SPRING WASHER

Richard J. McComb, Chicago, Ill., assignor to Woodings-Verona Tool Works, Verona, Pa., a corporation of Pennsylvania Application November 25, 1938, Serial No. 242,269

3 Claims. (Cl. 151—38)

This invention relates to springs, and more particularly to washer-like springs adapted to be used as bolt tensioning members and nut locks in rail joint assemblies, although such springs may have other applications in various combinations comprising a spring adapted to be compressed between two opposed members for exerting an expanding pressure between them.

It is among the objects of this invention to provide a spring washer of maximum strength in proportion to its size, the compression of which is limited to an amount that the spring can stand without danger of breaking or losing its resiliency, and in which bending is localized near the ends of the spring. A more special object is to provide such a spring washer which can be compressed between non-parallel members without sufficient localized strains being set up in the spring at one side of the bolt to cause danger of breakage.

In accordance with this invention a spring washer is formed from a piece of bar spring steel arched longitudinally. The central portion of the spring is thickened to make it substantially rigid and is provided with an inwardly projecting portion which limits the amount that the spring can be flattened by a nut on a bolt passing through the center of the spring. The spring is substantially rectangular with its corner portions turned outwardly, preferably by curving the ends of the spring transversely. Because of this shape, the ends of the spring between the corners will engage a backing-up member even though it is not parallel to the bolt head or nut which engages the other side of the spring. Consequently, the compression forces on the spring are not concentrated near one side edge. Preferably, the inner surfaces of the thickened central portion of the spring at each side of its bolt hole are inclined away from the opening and toward the outer face of the spring so that a portion immediately adjoining the opening can engage the backing-up member when the spring is flattened.

In many mechanical assemblies, particularly in rail joints, two or more members are clamped together by a bolt under conditions which make it desirable that the tension of the bolt be maintained regardless of wear of the nut and the bolt head that may take place in service. It is also desirable in such assemblies that a spring be provided for preventing the nut on the bolt from being loosened from vibration or like causes to which such structures may be subjected. Such springs in rail joints help maintain tightness and rigidity of the joints, increase the life of the rails and splice bars, and prevent accidents due to faulty joints. While it will be obvious that the spring washer herein described and claimed may find uses in other fields, it is particularly designed for and will be described as applied to a rail joint assembly.

In accordance with this invention a generally rectangular spring washer is bowed longitudinally and is provided with a central inward abutment to limit flattening of the washer and thereby prevent it from being over stressed. The corner portions of the washer are turned outwardly so that when it is used between non-parallel compression members, the ends of the washer, at points between their corner portions, will engage one of those members. As a result, the compression forces are not localized in two corners of the spring. The inner face of the abutment is also preferably shaped so that when the spring is flattened the abutment will engage the adjoining member at a point spaced from the edge of the spring.

Figure 2:
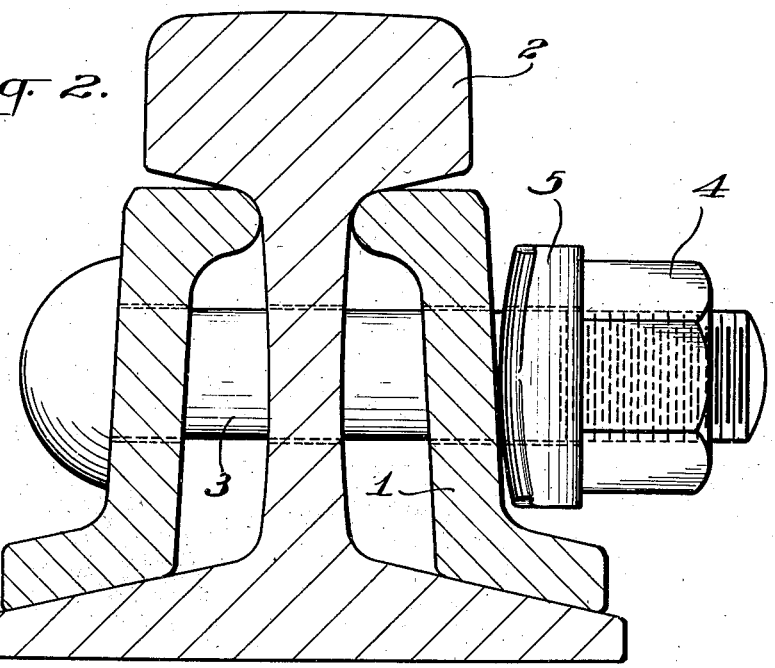
Figure 3:
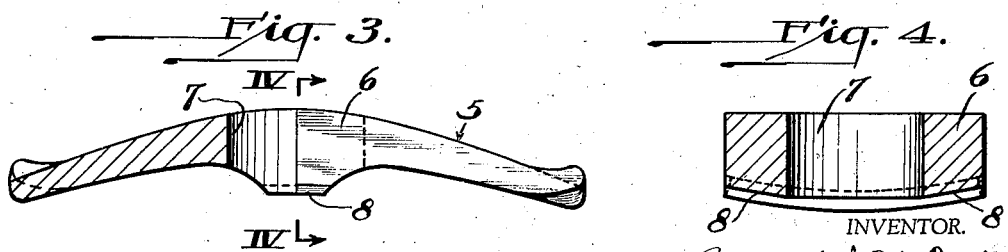
Figure 4:
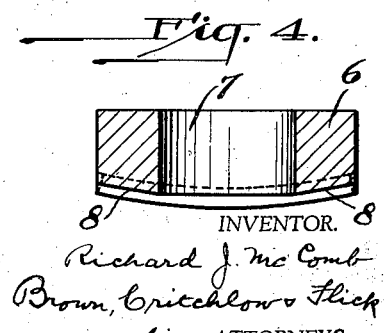

The preferred embodiment of the invention is illustrated in the accompanying drawing in which Fig. 1 is a fragmentary side view of a rail joint to which fishplates are connected by a bolt on which my spring washer is mounted; Fig. 2 is a vertical section through the rail showing the compressed washer in end elevation; Fig. 3 is a side view of the washer partly in longitudinal section; and Fig. 4 is a transverse section taken on the line IV—IV of Fig. 3.

Referring to the drawing, splice bars or fishplates 1 are clamped against the sides of adjacent rail ends 2 by means of bolts 3 on which nuts 4 are threaded. The spring washer 5 forming the subject-matter of this invention is disposed between a nut and splice bar and serves to maintain a constant tension on the bolt when the nut is turned down to compress the spring. The spring is substantially arcuate in edge or side view, and is preferably of substantially rectangular shape in plan or top view. As shown in Fig. 3, it consists of a section of rolled bar spring steel having its outer face convex or arcuate and its inner face formed by two outer concave surfaces connected together by a generally convex central surface. This results in a thickened central portion 6 containing sufficient metal to make it substantially rigid from the point of view of bending strains applied to the spring in its normal use. The thickened central portion also provides a hump or abutment adapted to contact with and seat against the outer face of the adjoining splice bar when the spring is under maximum compression. This thickened central portion also furnishes a zone of heavy metal through which a perforation 7 is made to receive the bolt. The end portions of the spring are of substantially uniform thickness throughout any transverse cross section, but they taper in thickness longitudinally toward their free ends. The concave and convex curves on the inner face of the spring merge into each other so that there are no sharp breaks that would produce abrupt changes of thickness at any point and might lead to localization of strain and consequent fatigue failure.

In its normal unstressed condition the seating face of the central portion of the spring is spaced outwardly from the splice bar against which the ends of the spring are disposed. When the nut is turned down on the bolt the increased tension flattens the arcuate spring and thereby forces the thickened central portion inwardly until its inner face seats against the bar. Therefore, no matter how much the bolt tension may be increased the spring can not be further distorted and consequently it can not be overstrained. Of course, the original proportioning of the spring is such that abutment 6 will seat before the end portions of the spring will have bent or distorted beyond their elastic limit. As the greatest stresses are localized midway between the ends of the spring, and as they decrease as the ends are approached, the spring tapers toward each end.

If the inner face of the nut and the adjacent splice bar were parallel, the nut would engage the central portion of the spring above and below the bolt hole, and the ends or tips of the spring would engage the splice bar throughout their widths if they were straight. Under such conditions the compression strains are applied uniformly to the spring throughout its width. However, in actual practice the nut and splice bar are often not parallel. This may be due to various factors, such as wear at the top or bottom of the splice bar, or it may be due to the use of what is known as "head free" splice bars which are made so that they normally are inclined a few degrees from vertical. This type of bar is illustrated in Fig. 2. If a spring washer having transversely straight ends is used under such conditions, the ends of the spring will lie against the splice bar but the outer face of the spring will be inclined to the nut so that it is engaged by the nut only below the bolt hole near the lower edge of the spring. Consequently, the entire compression force imparted to the spring by the nut is localized in this small area near the bottom of the spring and in its lower corner portions. Not infrequently this localization of strain causes the washer to break.

It is a feature of this invention that my spring is so formed that when used between non-parallel compression members, such as shown in Fig. 2, it will lie flat against nut 4 and engage the splice bar at points removed an appreciable distance from the lower edge of the spring. Accordingly, the corners of the spring are bent outwardly, preferably by curving the ends of the spring transversely. As a result, the lower corners are spaced from the splice bar even when the spring lies flat against the nut as in Fig. 2, and therefore the ends of the spring must engage the splice bar at points spaced some distance from the lower edge of the spring. Although the ends could be curved to such an extent that they would engage the bar substantially on a level with the center of the bolt. it is believed to be unnecessary that the engagement be at such a high point as far as the danger from breaking from unequally distributed strains is concerned.

To prevent the lower edge of the spring directly below the bolt from engaging the inclined splice bar when the spring is compressed, the contact surfaces 8 of the thickened middle portion of the spring above and below the bolt hole are curved or inclined outwardly from the hole and toward the outer face of the spring, as shown in Fig. 4. This inclination should be about the same as that of the corner portions so that the contact surface below the hole will either lie flat against the splice bar or engage it immediately adjacent the bolt hole. As a result of this construction the compression forces on the spring are applied to it near its longitudinal center line instead of at its lower edge, and danger of breakage is substantially eliminated.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. In a rail joint, the combination with a splice bar having an upwardly inclined outer face, a bolt extending substantially horizontally therethrough, and a nut threaded on the bolt adjacent said outer face of the bar, of a generally rectangular spring washer compressed between said bar and nut and having a central perforation through which said bolt extends, said washer being bowed longitudinally of said bar along the longitudinal axis of the washer with its concave side facing the bar and with its corner portions turned outwardly away from the bar so that the central portions only of its ends engage the bar, whereby compression forces are exerted on said washer by said nut substantially uniformly around said bolt-receiving perforation.

2. A generally rectangular spring washer bowed longitudinally along its axis and adapted to be partially flattened between opposed compression members, the compression member on the concave side of the washer being inclined transversely of the washer relative to the other compression member, said washer having a perforation in its central portion adapted to receive a bolt, the central portion of the ends of the washer being adapted to engage the compression member on the concave side of the washer, and the corner portions of the washer being turned outwardly, whereby compression forces are exerted on said washer substantially uniformly around said bolt-receiving perforation.

3. A generally rectangular spring washer bowed longitudinally and adapted to be partially flattened between opposed compression members, the compression member on the concave side of the washer being inclined transversely of the washer relative to the other compression member, the central portion of the washer being thickened to provide an inwardly projecting transverse abutment adapted to seat against one of said compression members upon partial flattening of the washer, said washer having a perforation in its central portion adapted to receive a bolt, the inner face of the portion of said abutment on each side of said perforation being inclined away from the perforation and toward the outer face of the washer, and the central portion only of the end portions of the washer being adapted to engage said one compression member wherefore said end portions are curved transversely away from said one compression member, whereby compression forces are exerted on said washer substantially uniformly around said bolt-receiving perforation.

RICHARD J. McCOMB.